Sept. 3, 1935.  J. V. THOMAS  2,013,222
PRESSURE CONTROL APPARATUS
Filed June 15, 1931  3 Sheets-Sheet 1
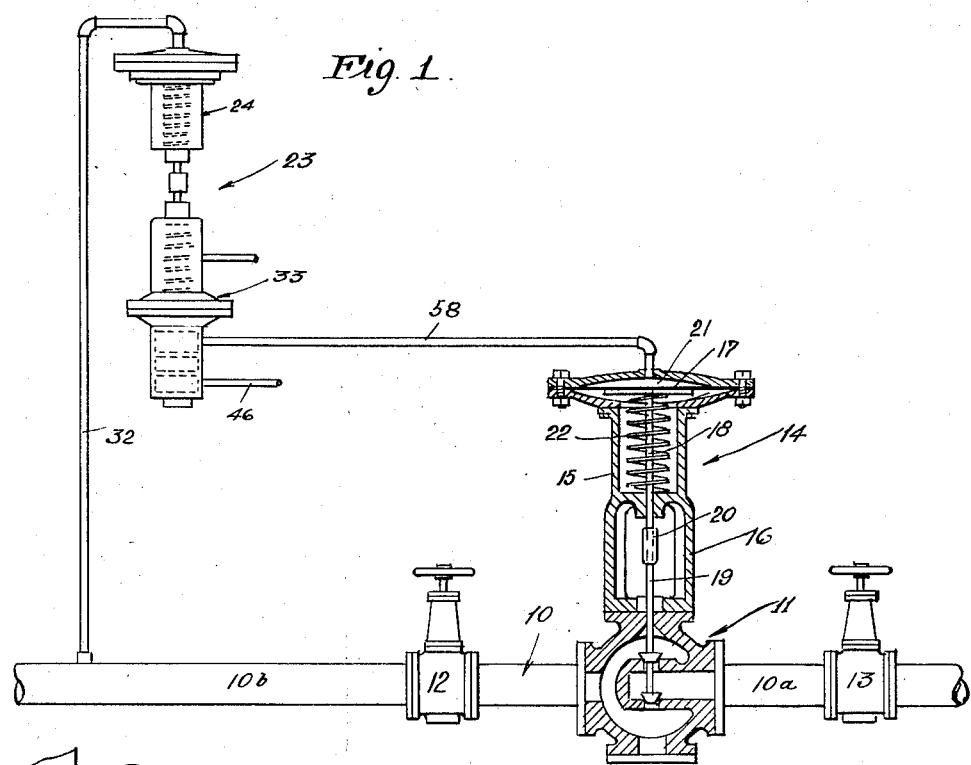
Fig. 1.
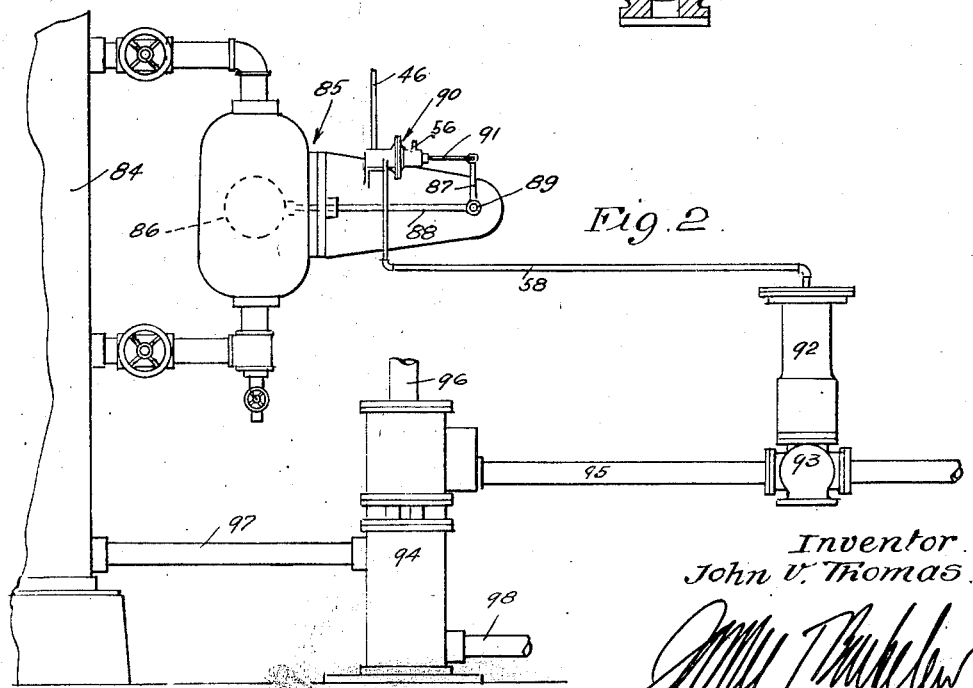
Fig. 2.
Inventor.
John V. Thomas.
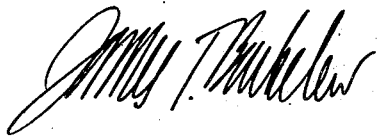
Attorney.

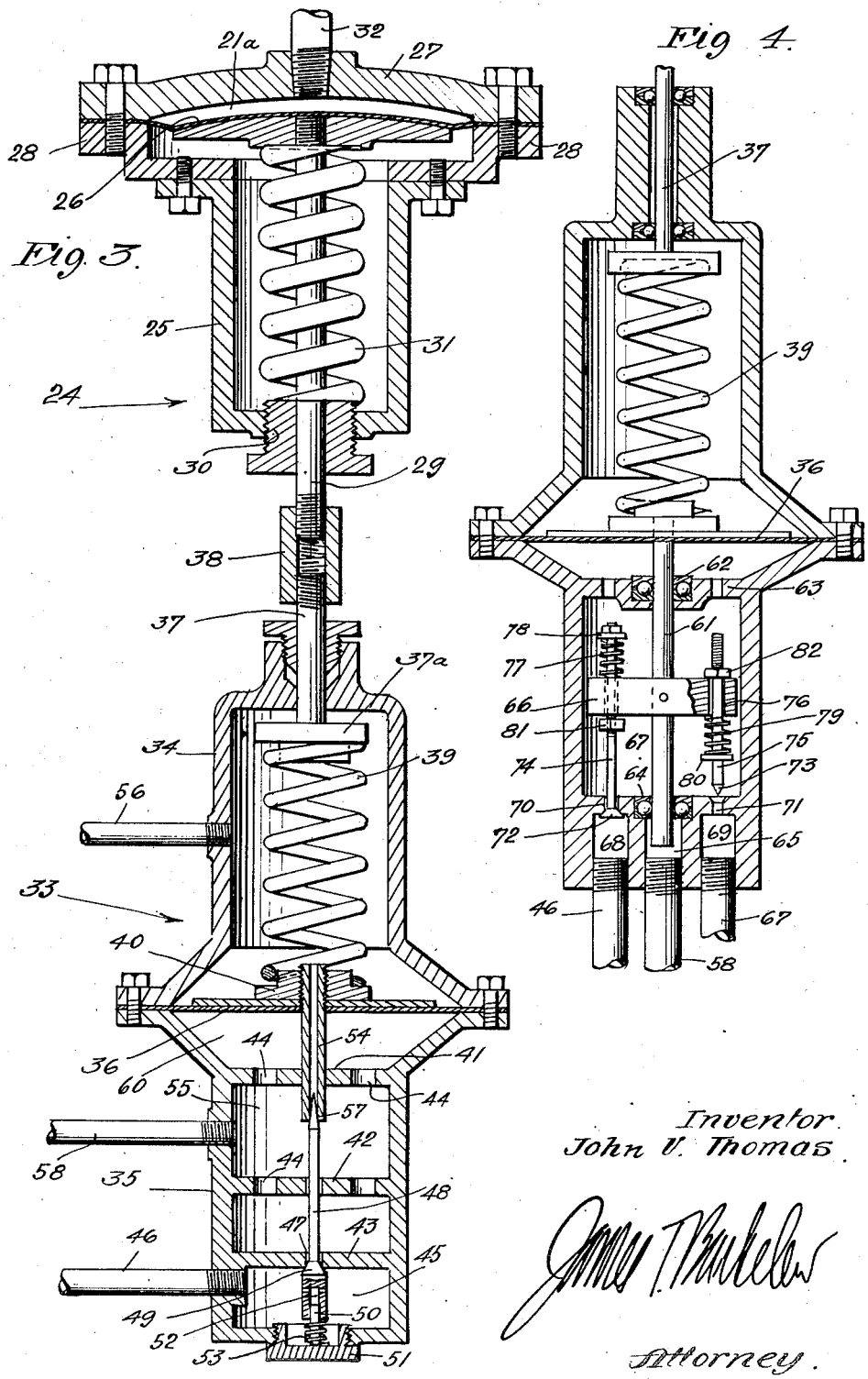

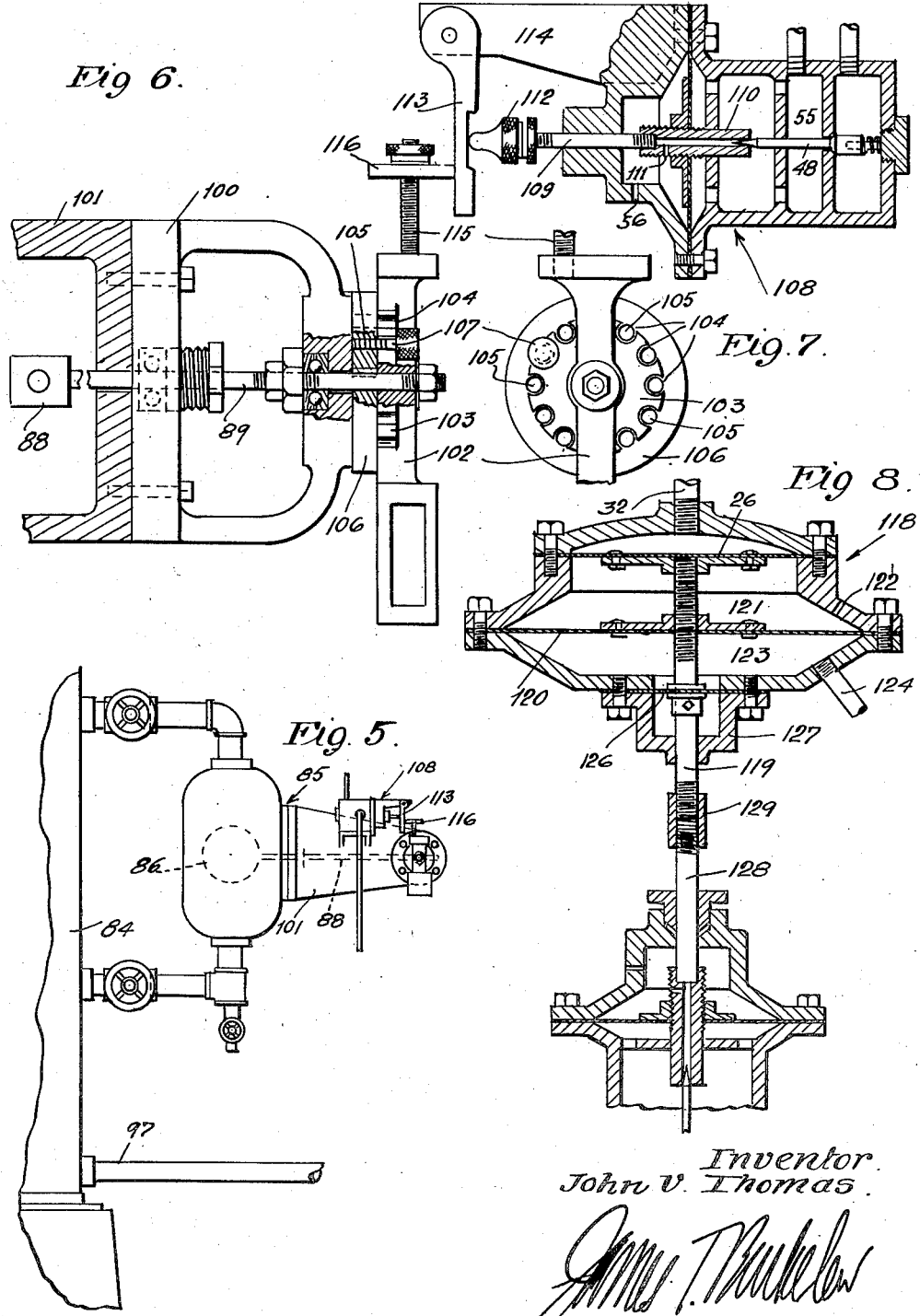

Patented Sept. 3, 1935

2,013,222

UNITED STATES PATENT OFFICE 2,013,222

PRESSURE CONTROL APPARATUS

John V. Thomas, Pasadena, Calif., assignor to Natural Gas Equipment Inc., Los Angeles, Calif., a corporation of California Application June 15, 1931, Serial No. 544,643

11 Claims. (Cl. 50—10)

This invention deals generally with control apparatus whereby the movement of one mechanism or member may be controlled in accordance with the movement of a second mechanism or member, through the intermediary of a fluid. In the majority of its aspects, the invention has to do particularly with an improved form of remote control valve which, when operated by what may be termed a "primary" movable member, regulates the application of fluid pressure to a "secondary" movable member to control the movement of the latter in accordance with that of the primary member.

As a typical circumstance in connection with which the remote control valve may be used, I may, for purposes of description, refer to the valve as being used for regulating the fluid pressure applied to a pressure responsive diaphragm, which in turn may be adapted to operate various mechanisms, such as valves and the like. One advantage gained through the use of valves of this type, lies in the fact that the valve may be located at a remote point from the mechanism which it operates or controls. The valve communicates with the secondary member or pressure responsive diaphragm by way of a fluid carrying conduit, the valve being operated by the primary moving member to increase the pressure acting on the diaphragm in accordance with the movements of the primary member. Heretofore in pressure control systems of this character, it has been customary to relieve the pressure against the diaphragm by providing, at some point between the valve and diaphragm, a vent through which the operating fluid is constantly bled. When pressure is to be applied to the diaphragm, an excess of operating fluid over that being vented to the atmosphere is admitted by the valve to the conduit leading to the diaphragm. And when the pressure acting against the diaphragm is to be relieved, the valve is closed and the operating fluid escapes through the vent opening to reduce the pressure.

It is a purpose of the invention to overcome one objection to pressure control systems of the character described due to the undesirable maintenance of a continuously vented stream of operating fluid. In accordance with the invention I have provided a remote control valve which operates to permit the venting of operating fluid only at such times pressure on the diaphragm is to be relieved, the vent being closed at all other times. It is a further object of the invention to provide a diaphragm type of remote control valve having the desirable features of simple construction, and of capability for extremely accurate and sensitive control.

The invention further contemplates the use of the present type of remote control valve in certain combinations wherein it is especially well adapted for use. I refer here to the use of the valve in pressure control systems for maintaining a constant pressure supply of fluid, and also in connection with liquid level control apparatus.

The above mentioned objects of the invention, as well as additional features and details embodied in certain typical and illustrative forms of the invention in connection with which it is herein described, will be understood most readily from the following description. Reference is had to the accompanying drawings, in which:

Fig. 1 is a general view showing a pressure control system embodying the invention, the main valve and regulator being shown in section;

Fig. 2 illustrates a variational embodiment of the invention in a liquid level control system;

Fig. 3 is an enlarged sectional view of the pilot regulator and remote control valve shown in Fig. 1;

Fig. 4 is a sectional view of a variational form of remote control valve;

Fig. 5 is a side elevation illustrating a liquid level control generally similar to that of Fig. 2, but variational as to certain details of the pilot valve and valve operating mechanism;

Fig. 6 is an enlarged fragmentary view of the valve and valve operating mechanism shown in Fig. 5; certain of the parts being shown in section and the valve being illustrated as swung around into the plane of the float arm rock shaft;

Fig. 7 is a fragmentary end view of the valve operating arm shown in Fig. 6; and Fig. 8 is a sectional view showing a variational form of pilot regulator and remote control valve assembly.

In Fig. 1 of the drawings, I show a pressure control system embodying the invention, adapted to maintain constant pressure at the low pressure side of a flow control valve placed in a fluid carrying line. Pipe 10 may be regarded as typical of any fluid conducting conduit, the flow through which is controlled by valve 11. I show the main flow control valve 11 as being typically of the balanced type. Hand operated valves 12 and 13 may be placed in line 10 at opposite sides of the main flow control valve.

It may be assumed that the fluid in line 10 at the low pressure side 10b of valve 11, is to be utilized for such purposes as require the fluid to be maintained at a constant pressure. The fluid in the pipe at the high pressure side 10a of the valve may be of any comparatively higher pressure, and the pressure may be constant or variable. It may be stated at this point that a substantially constant pressure is maintained in pipe 10 at the low pressure side of the valve by operating valve 11 in accordance with variations of pressure in the line at the low pressure side of the valve; the control apparatus functioning in such manner as to open the valve 11 as the pressure in 10b falls, and to close the valve as the pressure rises.

The valve 11 is operated by a main fluid pressure actuated regulator 14 comprising a hollow body 15 supported by yoke 16 on the valve. A pressure responsive diaphragm 17 is enclosed within the regulator body, a rod 18 being carried on the diaphragm and attached to the valve rod 19 by coupling 20. In the absence of pressure in space 21 above the diaphragm, the valve remains open by virtue of the upward thrust of spring 22 against the diaphragm.

Fluid pressure is applied to the upper face of the main regulator diaphragm 17 in accordance with variations in pressure in line 10b, by the pilot regulator and remote control assembly generally indicated at 23. Referring now to Fig. 3, the pilot regulator 24 comprises a hollow body 25 and a pressure responsive diaphragm 26 clamped between cover 27 and the upper flange portion 28 of the body. A valve operating rod 29 is secured to the diaphragm 26 and extends downward through a bushing 30 in the bottom of the body. Downward movement of the diaphragm and rod 29 is resisted by the thrust of coil spring 31 confined between the diaphragm and bushing 30, the tension of the spring being variable by adjusting the bushing. The space 21a within the pilot regulator above the diaphragm communicates with pipe 10b by way of conduit 32, diaphragm 26 being responsive to variations of pressure in line 10 at the low pressure side of the main flow control valve 11, by virture of the pressure being communicated to the diaphragm through line 32.

Pilot regulator 24 operates the remote control valve generally indicated at 33. The latter comprises a hollow body having upper and lower sections 34 and 35, between which is clamped a flexible diaphragm 36. A diaphragm operating rod 37 extends through the upper end of body section 34 and is connected to pilot regulator rod 29 by coupling 38. Coil spring 39 is confined between head 37a on the lower end of the rod 37, and washer 40 secured to the diaphragm 36. Rod 37 may be moved longitudinally relative to rod 29 to regulate the tension of spring 39 by adjustment of coupling 38.

While as will hereinafter appear, in some instances it may be preferred to attach the diaphragm operating rod 37 directly to the diaphragm, instead of placing spring 39 therebetween, I show the use of a spring in Fig. 3 primarily for the purpose of rendering diaphragm 36 less sensitive to slight movements of the pilot regulator diaphragm 26. Spring 31 preferably will have substantially greater tension than spring 39 so that for a predetermined downward movement of rods 29 and 37, the downward pressure exerted against diaphragm 36 will be comparatively less than the thrust of spring 31, counteracting the pressure exerted against diaphragm 35. Comparatively slight movements of the rod 37 will therefore result in compression of spring 39 without substantial depression of the pilot valve diaphragm.

Lower section 35 of the pilot valve body has a series of vertically spaced partitions 41, 42 and 43, there being a plurality of gas passing apertures 44 therein. The space 45 between partition 43 and the bottom of the valve body forms a chamber into which a suitable fluid, preferably a gas, is introduced through inlet 46. As will hereinafter appear, the main regulator 14 is operated, under control of the pilot valve, through the intermediary of the gas taken into the pilot valve from line 46. Such gas may be derived from any suitable source, and may be of any suitable pressure, constant or variable.

Chamber 45 is communicable with the upper interior of section 35 of the valve body, by way of port 47 in partition 43, the flow of gas from chamber 45 through port 47 being controlled by needle valve 48 having a tapered shoulder 49 seating against a correspondingly shaped face within port 47. A guide pin 50, integral with plug 51 screw threaded into the bottom of the body, has a sliding fit within bore 52 in the lower enlarged end of the needle valve, pin 50 serving as a guide for the needle valve in its longitudinal movement. Opening movement of the needle is resisted by a coil spring 53, the tension of which may be adjusted by turning plug 51.

Needle valve 48 extends through a central aperture in partition 42, the latter serving as a guide for the valve. A tube 54 is carried on the diaphragm 36, the tube being screw threaded into washer 40 and extending entirely through the latter to permit the flow of gas from space 55 through the diaphragm into the interior body section 34. The gas is then vented to the atmosphere through outlet 56. The upper tapered end of needle valve 48 projects into the lower end of tube 54, the latter having a tapered seat at 57 engaging the valve. It will be noted that tube 54 is confined against lateral deflection, resulting from flexing of the diaphragm, by partition 41, so that needle valve 48 will always be accurately alined, with the tube and will therefore always seat perfectly.

Space 55 communicates with space 21 above diaphragm 17 of the main regulator 14 by way of conduit 58, the pressure within space 55 thus being communicated to the upper face of the diaphragm 17. Since conduit 58 comprises the sole connection between the main regulator and the pilot regulator and remote control valve assembly, it will readily appear that the latter may be located at any remote distance from the main regulator.

In describing the operation of the system shown in Fig. 1, it may be assumed first that the pressure in line 10b has increased above the predetermined constant pressure which it is desired to maintain therein. At normal pressure in line 10b, the pilot regulator and remote control valve parts are in the position shown in Fig. 3, needle valve 48 seating within the lower end of tube 54 and the lower valve 49 closing aperture 47. Upon abnormal increase of pressure in 10b, the increased pressure is communicated through line 32 to the top surface of diaphragm 26, causing the latter to become depressed and rods 29 and 37 to move downward in accordance with the pressure applied to the diaphragm.

Pressure is thereupon transmitted through spring 39 against diaphragm 36, causing the latter to become depressed and valve 49 to open to permit the flow of gas from chamber 45 into space 55, the upper end of the needle valve remaining seated within tube 54 to prevent the escape of gas from space 55 through the diaphragm. The increased pressure in space 55, resulting from the opening of valve 49, thereupon is communicated through conduit 58 to the main regulator 14, diaphragm 17 therein being depressed and the valve rod 19 moved downward to throttle or close off the flow through valve 11. Valve 49 will remain open but temporarily, that is the valve will be unseated for just sufficient time for the required amount of pressure to be transmitted to the main regulator to actuate valve 11. After being temporarily opened, valve 49 then seats, the increased pressure in space 55 and conduit 58 serving to maintain valve 11 in partially or entirely closed position until the pressure in 10b decreases and returns to normal. Should valve 11 so throttle the flow in line 10 as to cause the pressure in 10b to fall below normal, the remote control valve will operate, as described immediately below, to cause valve 11 to open and increase the flow. Thus it will be seen that the time period during which valve 49 remains open, is temporary as compared with the corresponding movement of main flow control valve 11, valve 49 opening to admit increased pressure, and then seating to maintain the pressure against the main regulator diaphragm until pressure conditions in 10b are returned to normal.

Assuming now the pressure in 10b to fall below normal, the reduced pressure above diaphragm 26 results in upward movement of the diaphragm and rods 29 and 37 by the action of spring 31. Upon the simultaneous reduction of the pressure through spring 39 against diaphragm 36, the latter becomes deflected upward, raising tube 54, as a result of the gas pressure in space 60 acting against the under side of the diaphragm. As tube 54 is raised from engagement with the needle valve, the gas under pressure in space 55 escapes through the tube and vent 56 to the atmosphere, or to any suitable place at which the gas may be utilized. Reduction of pressure in space 55 is accompanied by a lowering of the pressure acting against the main regulator diaphragm, whereupon the main valve 11 is opened by the action of spring 22, to increase the flow to the low pressure side of line 10 until the pressure therein builds up to normal.

As previously explained with reference to the operation of valve 49 in bringing about increased pressure against the main regulator diaphragm, tube 54 remains unseated from the needle valve but temporarily, and only for such time as is required to lower the pressure in space 55 in conduit 58 to allow valve 11 to open the required amount. Thereafter tube 54 is returned to seated position against the needle valve, the main flow regulating valve 11 remaining in an open position until the pressure in 10b returns to normal.

While, for purposes of illustrating a typical installation of the invention, I have shown the valve assembly to be adapted for controlling the pressure at the outlet side of valve 11 by communication through line 32 with pipe 10b, it will be readily seen that the apparatus is equally adaptable for maintaining constant pressure in line 10 at the high pressure side of valve 11. Thus to maintain a constant pressure at the high pressure side of valve 11, line 32 may be connected into line 10a, at the right of valve 11, instead of at the low pressure side as shown.

In Fig. 4 I show a variational form of remote control valve generally similar to that in Fig. 3, but differing essentially as to the arrangement of the gas inlet and vent outlet and the outlet leading to the main regulator. The diaphragm 36 carries a depending rod 61, the upper end of which extends through bearing 62 in partition 63, the lower end of the rod being laterally supported in bearing 64 in the upper end of the body bore 65. Conduit 58 leading to the main regulator connects into the end of bore 65, there being sufficient clearance around rod 61 within the bearing 64 to permit unrestricted flow of gas from chamber 67 into conduit 65. Gas inlet 46 and the vent gas outlet 67 connect into bores 68 and 69 which communicate through valve controlled orifices 70 and 71 with chamber 67.

The flow of gas into the chamber 67 is controlled by valve 72, the escape of gas from the chamber to the outlet or vent line 67 being controlled by needle valve 73. Valve rods 74 and 75 extend vertically through bores 76 in the cross piece 66, the valve rods being vertically movable relative to the cross piece. Valve 72 normally is held in seated position by the action of coil spring 77 confined between washer 78 and the upper edge of cross piece 66, valve 73 likewise being normally seated by the action of spring 79 confined between lug 80 on the valve rod and the bottom edge of the cross piece. Valves 72 and 73 are adapted to be opened upon movement of rod 61 in opposite directions, by the engagement of cross piece 66 with nuts 81 and 82 on the valve rods, as will now appear.

Upon downward movement of rod 37 by the operation of a pilot regulator, or other primary or movable member, in accordance with the movements of which it is desired to operate the main regulator or secondary movable member, diaphragm 36 is depressed, causing downward movement of rod 61. Cross piece 66 is thereupon brought into engagement with nut 81 to open inlet valve 72 to permit the flow of operating gas from supply line 46 to chamber 67, and thence through line 58 to the main regulator or secondary movable member. During downward movement of cross piece 66, spring 79 is compressed, holding the vent valve 73 closed. Upon upward movement of rod 37, accompanied by upward deflection of diaphragm 36 as a result of the pressure exerted on its under side by the gas in chamber 67, cross piece 66 engages nut 82, opening vent valve 73 to release the pressure in chamber 67 and line 58, spring 71 being compressed to maintain the inlet valve closed.

In Fig. 2 of the drawings I show the use of a remote control valve constructed in accordance with the invention, in connection with a liquid level control system. Numeral 84 indicates a tank containing liquid which it is desired to maintain at a predetermined level, there being attached to the tank a float mechanism, generally indicated at 85, which may be of any conventional type well known to those familiar with the art. As the liquid level in the tank rises or falls, float 85 rises or falls accordingly, imparting a rocking motion to arm 87 attached to the float arm 88, the two arms being mounted on rock shaft 89.

The remote control valve 90 may be similar to the described forms shown in Figs. 3 and 4 in which movement of the valve operating rod 91 is imparted to the diaphragm 36 through the intermediary of spring 39; or rod 91 may be attached directly to the diaphragm as in the hereinafter described form shown in Figs. 6 to 8. Operating gas is supplied to the remote control valve through line 46; line 58, as in Fig. 1, leading to the main regulator 92 which operates valve 93 to control the flow of steam to pump 94 through line 95. Steam is exhausted from the pump through line 96. Line 97 leads from tank 84 to the pump 94, the latter operating to discharge the tank liquid through outlet 98 in accordance with variations in the liquid level within the tank, and under control of valve 90, as will now appear.

As the float 86 rises, rod 91 is moved to the right to relieve the pressure on the diaphragm within valve 90, whereupon, by virtue of the exhaust of operating gas through vent 56, the pressure in line 58 is reduced to permit valve 93 to open under the action of the main regulator 92. The operation of pump 94 is speeded up due to the increased supply of steam thereto, whereupon liquid is pumped from the tank at an increased rate until the liquid level therein and float 86 drops to normal. As float 86 drops below its normal level, rod 91 is moved to the left to increase the pressure on the remote control valve diaphragm, whereupon the pressure in line 58 is increased and valve 93, through regulator 92, is moved toward closed position, reducing the supply of steam to the pump. The operation of the latter therefore becomes slowed down or stopped until the liquid level in the tank builds up to normal.

In Fig. 5 I show a remote control valve and float mechanism generally similar to that of Fig. 2, but differing essentially in embodying certain features of improvement whereby the operation of the valve becomes more sensitized through capability of adjustment of the valve operating parts. Referring to Fig. 6, the rock shaft 89 to which the float arm 88 is attached, extends through a yoke 100 secured to the side of the float housing 101. Valve operating arm 102 is carried on the outer end of rock shaft 89, oscillatory movement being imparted to arm 102 upon rocking movement of shaft 89. Arm 102 is integral with a circular plate 103 having a series of spaced circular openings 104 or slots in its periphery, openings 104 being adapted to register with a circular series of correspondingly spaced threaded openings 105 in a disk 106 placed between arm 102 and yoke 100. Disc 106 is keyed or otherwise non-rotatably attached to the rock shaft. Arm 102 is attached to plate 106 by screw 107 inserted through one of the peripheral openings 104 in plate 103, and threaded into a registering opening 105 in disk 106. As will appear, the position of arm 102 relative to disk 106 and therefore the position of the arm on the rock shaft, may be varied by removing screw 107 and turning arm 102 on the shaft to bring another pair of openings 104, 105 into registration, and inserting a screw therein.

The remote control valve 108 is generally similar to the described forms, except that the valve operating rod 109 attaches directly to the diaphragm instead of through the intermediary of a spring. Rod 109 is shown to be screw threaded into the end of the diaphragm carried tube 110, the flow of gas from the valve chamber 55 through tube 110 to the vent port 56 being permitted by drilling an escape orifice 111 in the tube at the vent side of the diaphragm. Rod 109 carries on its outer end an adjustable nut 112 which is engaged by lever 113 pivotally supported upon arm 114 of the valve body.

It will be understood that in accordance with the showing of Fig. 5, the remote control valve 108 will be positioned so that the vertical plane of its longitudinal axis extends at right angles to the vertical plane of the rock shaft 89. However, for purposes of illustration, I have shown the valve 108 to be swung around into the plane of the rock shaft so that the float arm parts and the valve may appear in longitudinal section in the same view.

Arm 102 carries on its upper end a threaded stud 115 upon which is screwthreaded a flanged nut 116. By adjusting nut 112 on the valve operating rod, lever 113 is brought to engage at all times both nuts 112 and 116. Upon oscillatory movement of arm 102 longitudinal movement is imparted to rod 109 to operate the needle valve 48. It will be unnecessary to go further into detail regarding the operation of the pilot valve, since this has been fully set forth hereinabove with reference to the valve shown in Fig. 3.

By virtue of the valve operating rod 109 having direct operative connection with the float arm, it will be seen that the valve is rendered sensitive to the movement of the float arm. The sensitivity of the valve may however be regulated by the adjustment of nut 116 on threaded stud 115, so as to vary the effective leverage against nut 112 through the lever 113. Thus by adjusting nut 116 toward the outer end of lever 113, the sensitivity of operation of the remote control valve is increased due to the fact that a greater leverage is had by nut 116 acting against the valve rod, to overcome the weight of the float. Conversely, by adjusting nut 116 to approach nut 112, or to a point closer than nut 112 to the pivot point of the lever, the sensitivity of operation of the valve will be decreased, since the leverage through which movement is imparted to the valve rod will be decreased, and the counterbalancing effect on the weight of the float, lessened.

In case it is desired to maintain the liquid in the tank at a higher or lower level than that at which the apparatus is set to maintain, the adjustment between the rocker arm and disk 106 permits variation of the level control without necessitating the changing in any way of the adjustment between the rocker arm and valve 108. In order to maintain a higher or lower liquid level in the tank, it is but necessary to remove screw 107 and swing the float arm up or down as the case may be, and then reinsert screw 107 within the openings 104 and 105 that may then be in registration in the changed position of disk 106.

In Fig. 8 I show a variational form of pilot regulator in combination with a remote control valve of the general character shown in Fig. 6. The pilot regulator 118 differs essentially from that shown in Fig. 3 in that depression of the diaphragm 26 carrying rod 119, is counteracted by fluid pressure exerted against a second diaphragm, instead of by a spring as in the first described form. Rod 119 is attached to a diaphragm 120 of comparatively larger area than diaphragm 26, the relative areas of the diaphragms being such that fluid at a comparatively low pressure acting against the underside of diaphragm 120, will counteract the downward pressure on diaphragm 26 exerted by a fluid at comparatively high pressure carried in line 32. Space 121 between the diaphragms is vented to the atmosphere through aperture 122. An upward reacting pressure is exerted against diaphragm 120 by fluid introduced to space 123 through line 124, the fluid used being derived from any suitable source. As will be seen, the sensitivity of the regulator may be varied by controlling the fluid pressure in space 123. Conduit 124 may be led to any remote source of fluid supply, at which point the fluid pressure may be regulated by suitable remote control.

Space 123 is sealed against the escape of fluid through the lower end of the body around rod 119, by attaching a comparatively small diaphragm 126 to the rod, the diaphragm being held between the body and cap 127 as in the first described form of regulator and remote control valve combination. The relative longitudinal positions of rod 119 and valve operating rod 128 may be varied by adjusting coupling 129.

I claim:

1. Apparatus of the character described comprising, a primary movable member, a secondary movable member operable by fluid pressure in accordance with movements of said primary member, a line for supplying operating fluid under pressure to said secondary member, a diaphragm, means through which movement of said primary member is transmitted to the diaphragm, a diaphragm controlled valve for regulating the flow of operating fluid to said secondary member, one side of said diaphragm being exposed to operating fluid pressure, and a second diaphragm controlled valve for releasing fluid in said line between the secondary member and the first mentioned valve, said valves being in tandem arrangement and one valve being adapted to open at substantially the point at which the other closes.

2. Apparatus of the character described comprising, a primary movable member, a secondary movable member operable by fluid pressure in accordance with movements of said primary member, a line for supplying operating fluid under pressure to said secondary member, and an operating fluid control device comprising, a body communicating through said line with said secondary member, a diaphragm within said body, one side of said diaphragm being exposed to operating fluid pressure, means operatively connecting the diaphragm to said primary member, and a pair of valves in tandem arrangement, operatively connected to said diaphragm to control the pressure of operating fluid against said secondary member.

3. Apparatus of the character described comprising, a primary movable member, a secondary movable member operable by fluid pressure in accordance with movements of said primary member, a line for supplying operating fluid under pressure to said secondary member, and an operating fluid control device comprising, a body communicating through said line with said secondary member, a diaphragm in said body operatively connected to said primary member, one side of said diaphragm being exposed to operating fluid pressure, yielding means for transmitting movement from said primary movable member to the diaphragm, a valve operable by said diaphragm to control the flow of operating fluid to said secondary member; and a second valve operable by said diaphragm to control the flow of fluid from a point in said line between the secondary member and the first mentioned valve through a passage extending through said diaphragm.

4. Apparatus of the character described comprising, a primary movable member, a secondary movable member operable by fluid pressure in accordance with movements of said primary member, a line for supplying operating fluid under pressure to said secondary member, and an operating fluid control device comprising, a hollow body, a diaphragm in said body, means for transmitting movement from said primary movable member to the diaphragm, one side of said diaphragm being connected to said primary member, means for supplying operating fluid to a space in said body at the opposite side of the diaphragm and to which the diaphragm is exposed, said space being communicable with said line, and a pair of valves in tandem arrangement, operable by said diaphragm for controlling the flow of operating fluid to said secondary member.

5. Apparatus of the character described comprising, a primary movable member, a secondary movable member operable by fluid pressure in accordance with movements of said primary member, a line for supplying operating fluid under pressure to said secondary member, and an operating fluid control device comprising, a hollow body, a diaphragm in said body, means for transmitting movement from said primary movable member to the diaphragm, one side of said diaphragm being connected to said primary member, means for supplying operating fluid to a space in said body at the opposite side of the diaphragm and to which the diaphragm is exposed, said space being communicable with said line, a valve operable by said diaphragm for controlling the flow of operating fluid to said secondary member, and a second valve rigidly connected to and in tandem arrangement with the first mentioned valve and operable by said diaphragm to control the flow of fluid from said line to an escape passage.

6. Apparatus of the character described comprising, a primary movable member, a secondary movable member operable by fluid pressure in accordance with movements of said primary member, a line for supplying operating fluid under pressure to said secondary member, and an operating fluid control device comprising, a hollow body, a diaphragm in said body, yielding means for transmitting movement from said primary movable member to the diaphragm, one side of said diaphragm being connected to said primary member, means for supplying operating fluid to a space in said body at the opposite side of the diaphragm and to which the diaphragm is exposed, said space being communicable with said line, a valve operable by said diaphragm for controlling the delivery of operating fluid to said space and to the secondary member, and a second valve operable by the diaphragm to control the flow of operating fluid from said space to an escape passage.

7. In apparatus of the character described, the combination comprising, a hollow body, a diaphragm in said body, there being a closed fluid containing space within said body at one side of the diaphragm, means for applying pressure to the opposite side of the diaphragm, said means comprising a longitudinally movable member extending into said body and whose movement is communicated to the diaphragm, a fluid pressure responsive element connected to said member, means resisting movement of said element in one direction, a pressure fluid inlet and an outlet communicable with said space, a valve controlling fluid flow through said inlet, a valve controlling flow through said outlet, both said valves being controlled by the diaphragm, and means rigidly interconnecting said valves to cause the seating of the inlet valve to hold the outlet valve stationary as the diaphragm moves away from it.

8. Apparatus of the character described comprising, a primary movable member, a secondary movable member operable by fluid pressure in accordance with movements of said primary member, a line for supplying operating fluid under pressure to said secondary member, a diaphragm, means through which movement of said primary member is transmitted to the diaphragm, a diaphragm controlled valve for regulating the flow of operating fluid to said secondary member, one side of said diaphragm being exposed to operating fluid pressure, a tube carried by said diaphragm, and a diaphragm controlled needle valve projecting into and seating against said tube, the last mentioned valve releasing fluid in said line between the secondary member and the first mentioned valve, said valves being rigidly connected in tandem arrangement.

9. Apparatus of the character described comprising, a primary movable member, a secondary movable member operable by fluid pressure in accordance with movements of said primary member, a line for supplying operating fluid under pressure to said secondary member, a diaphragm, means through which movement of said primary member is transmitted to the diaphragm, a diaphragm controlled valve for regulating the flow of operating fluid to said secondary member, one side of said diaphragm being exposed to operating fluid pressure, a tube carried by said diaphragm, means engaging said tube to prevent its moving laterally, and a diaphragm controlled needle valve projecting into and seating against said tube, the last mentioned valve releasing fluid in said line between the secondary member and the first mentioned valve, said valves being rigidly connected in tandem arrangement.

10. Apparatus of the character described comprising, a primary movable member, a secondary movable member operable by fluid pressure in accordance with movements of said primary member, a line for supplying operating fluid under pressure to said secondary member, a diaphragm, means through which movement of said primary member is transmitted to the diaphragm, a diaphragm controlled valve for regulating the flow of operating fluid to said secondary member, one side of said diaphragm being exposed to operating fluid pressure, and a diaphragm controlled valve for releasing fluid in said line between the secondary member and the first mentioned valve, said valves being in tandem arrangement and one valve being adapted to open at substantially the point at which the other closes, means for applying fluid pressure to said primary movable member, and means whereby movement of said secondary movable member results in a variation of the fluid pressure acting against the primary member.

11. Apparatus of the character described comprising, a primary movable member, a secondary movable member operable by fluid pressure in accordance with movements of said primary member, a line for supplying operating fluid under pressure to said secondary member, a diaphragm, means through which movement of said primary member is transmitted to the diaphragm, a diaphragm controlled valve for regulating the flow of operating fluid to said secondary member, one side of said diaphragm being exposed to operating fluid pressure, and a diaphragm controlled valve for releasing fluid in said line between the secondary member and the first mentioned valve through an opening in the diaphragm, said valves being rigidly connected in tandem arrangement and one valve being adapted to open at substantially the point at which the other closes, means for applying fluid pressure to said primary movable member, and means whereby movement of said secondary movable member results in a variation of the fluid pressure acting against the primary member.

JOHN V. THOMAS.